June 12, 1962 M. S. BUD 3,039,103
TIME RECORDING DEVICES
Filed July 17, 1959 12 Sheets-Sheet 1

Martin S. Bud
Inventor

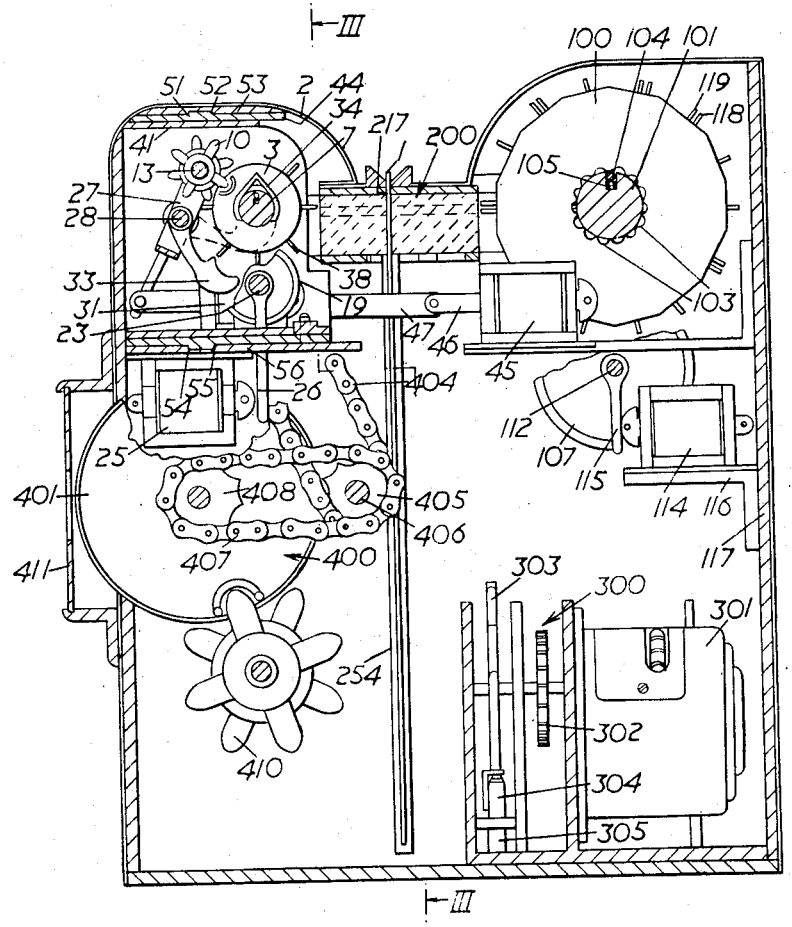

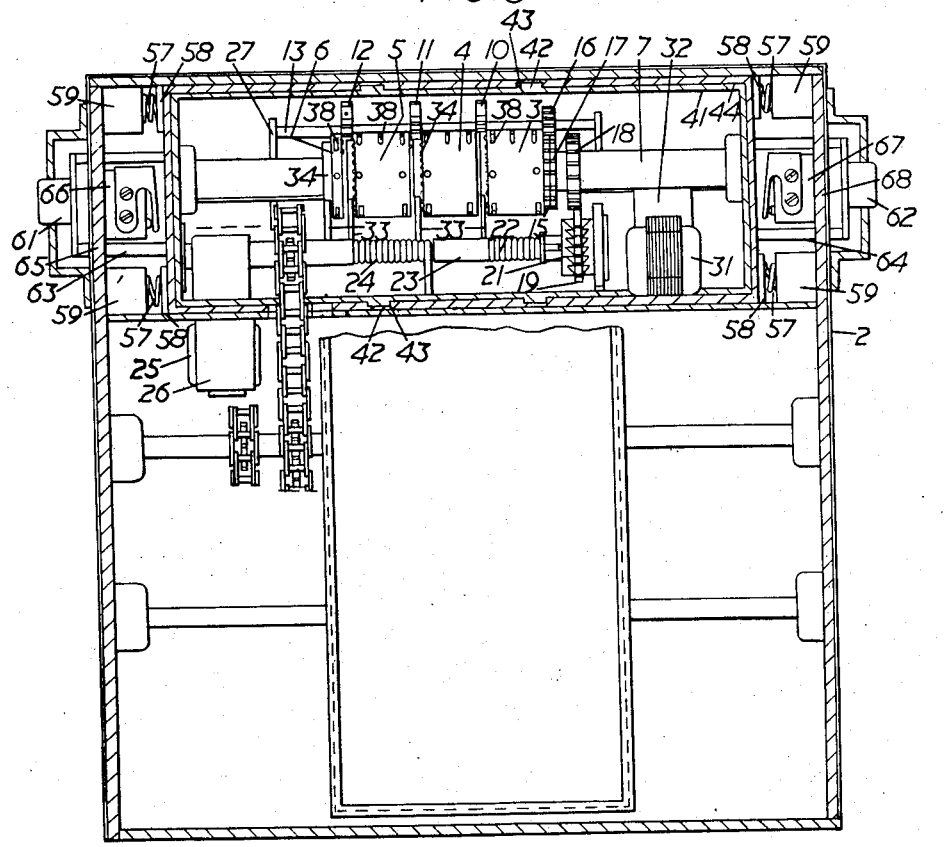

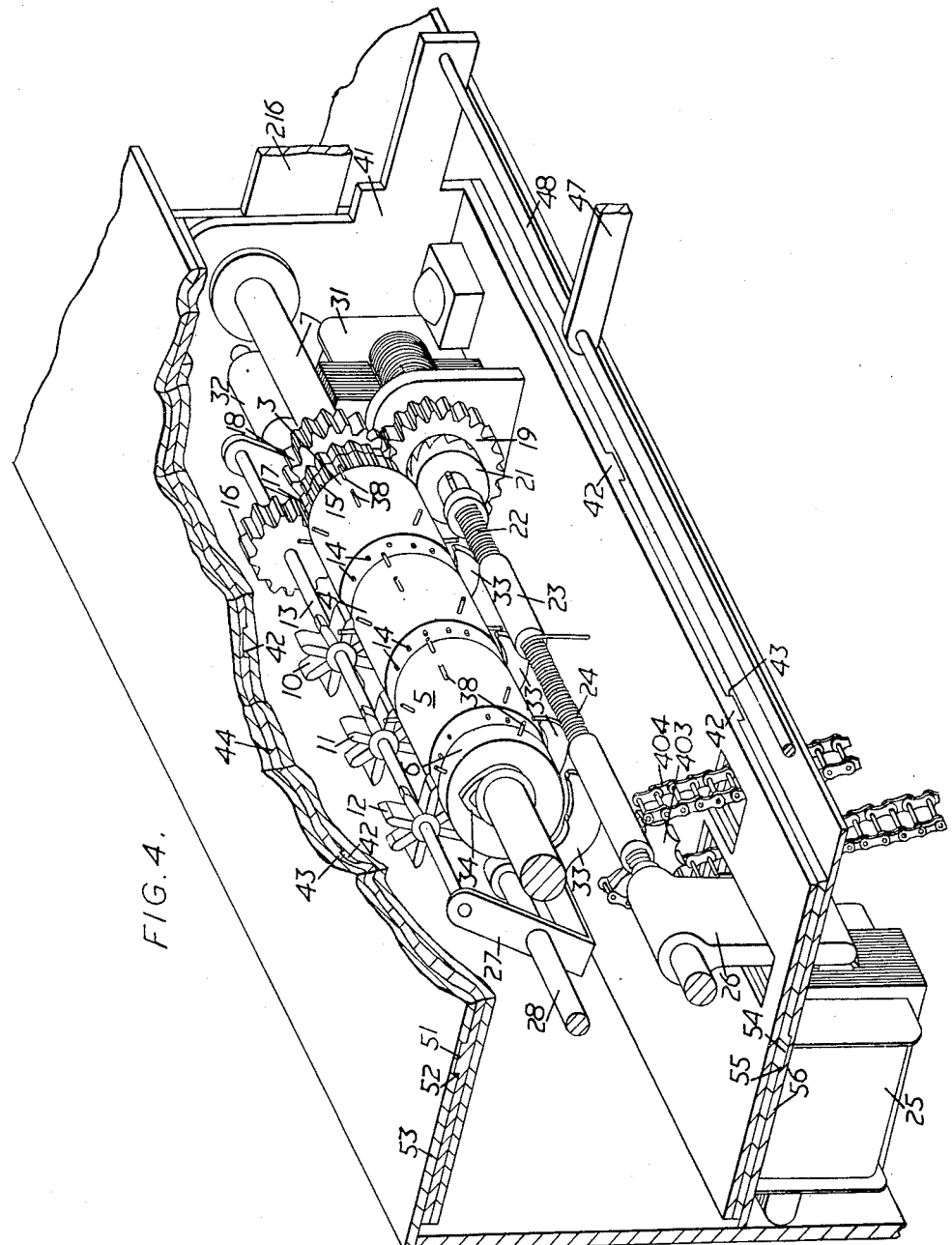

June 12, 1962   M. S. BUD   3,039,103
TIME RECORDING DEVICES
Filed July 17, 1959   12 Sheets-Sheet 5

Martin S. Bud
Inventor

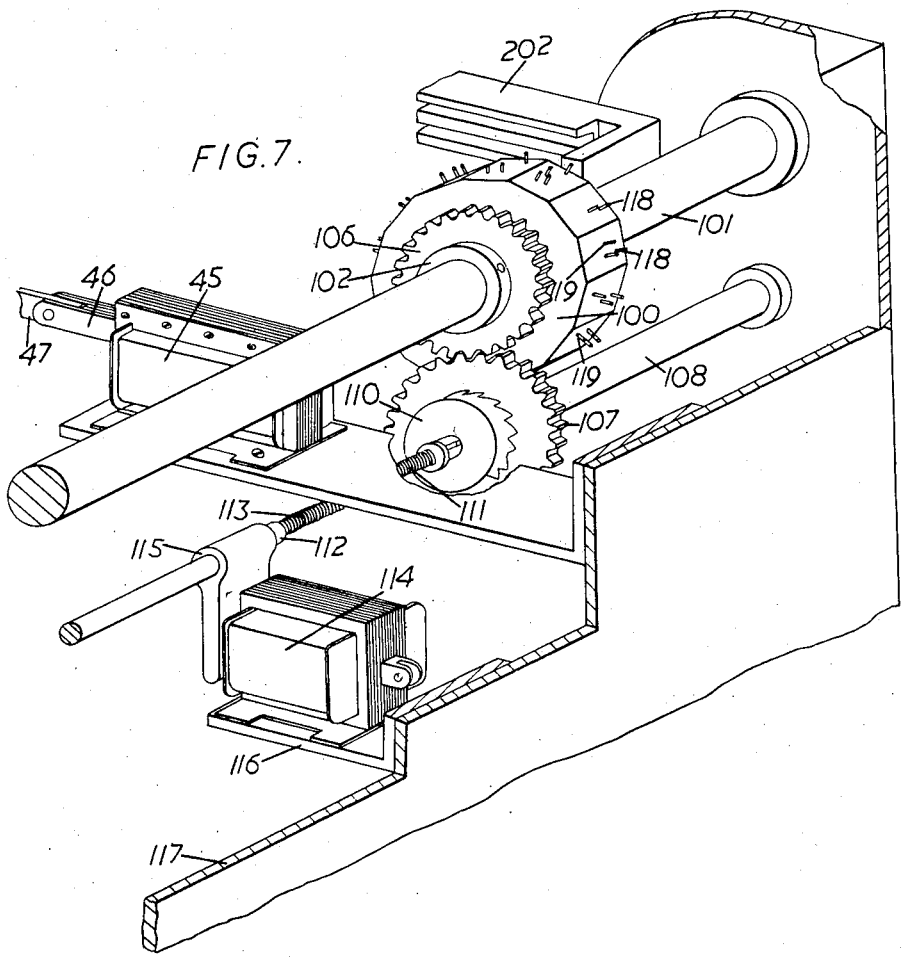

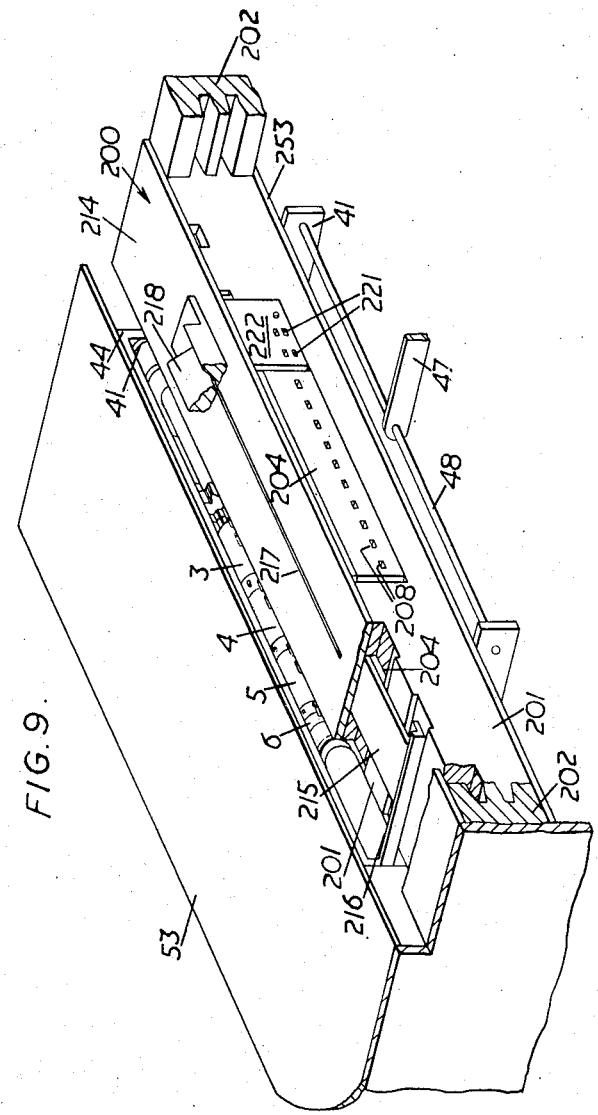

June 12, 1962 M. S. BUD 3,039,103
TIME RECORDING DEVICES
Filed July 17, 1959 12 Sheets-Sheet 8
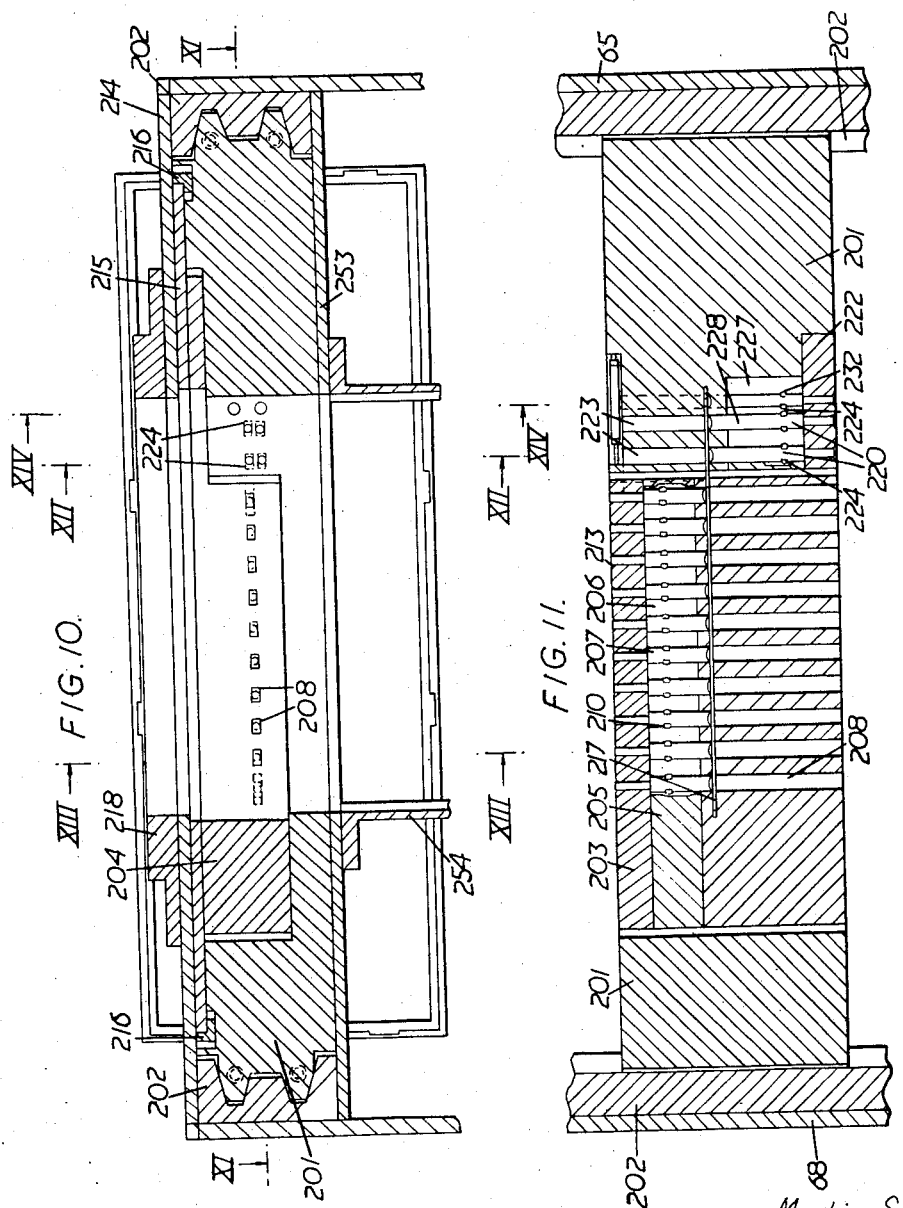
Martin S. Bud
Inventor

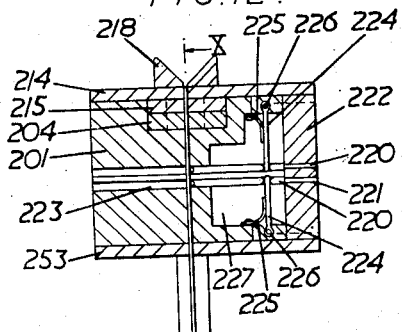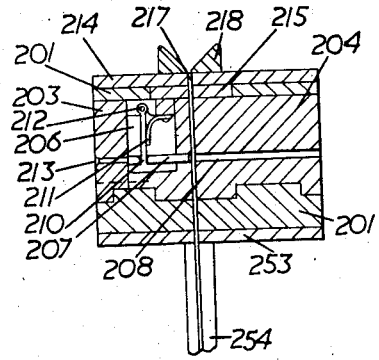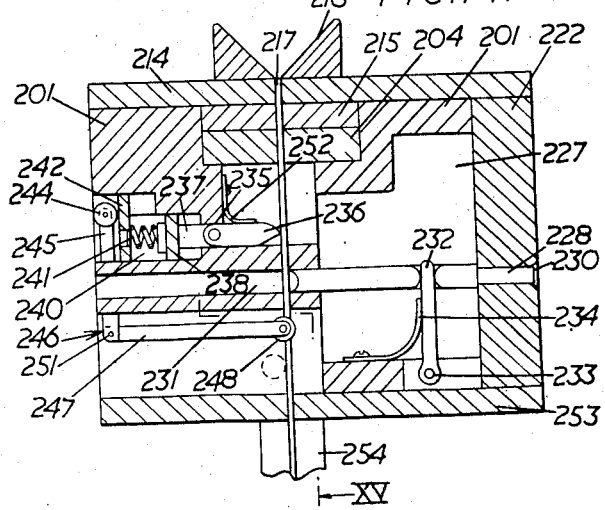

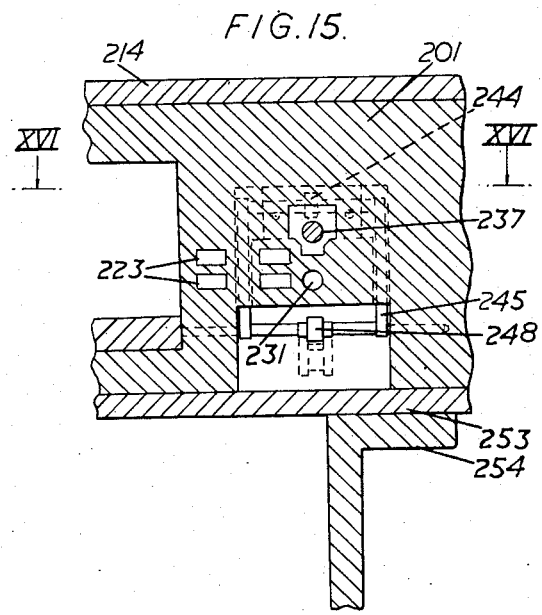
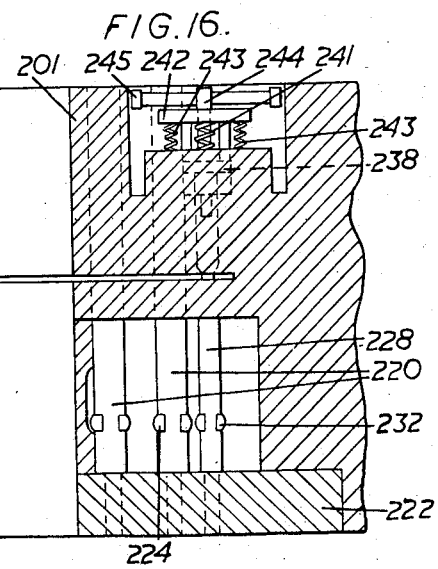

June 12, 1962 M. S. BUD 3,039,103
TIME RECORDING DEVICES
Filed July 17, 1959 12 Sheets-Sheet 11

Martin S. Bud
Inventor

June 12, 1962 M. S. BUD 3,039,103
TIME RECORDING DEVICES
Filed July 17, 1959 12 Sheets-Sheet 12

Martin S. Bud
Inventor

United States Patent Office 3,039,103
Patented June 12, 1962

3,039,103
TIME RECORDING DEVICES
Martin S. Bud, 9 Heathgate, London, England
Filed July 17, 1959, Ser. No. 827,962
3 Claims. (Cl. 346—87)

The invention relates to time recording devices for registering times on record cards to indicate the commencing and finishing times of workpeople's attendances, jobs, and the like.

In known such devices a record card is inserted into the device and the time of insertion, sometimes combined with the relevant date, is imprinted on the card in fields suitably provided thereon, the time being usually indicated in hours and minutes, or in hours and decimal fractions of hours. The imprints on the cards have to be evaluated by a clerk. Experience has shown that the evaluation of the imprinted cards is tedious, and that mistakes are likely to occur, for example, by confusing a time of commencing a job with that of finishing the job or by overlooking the dates when a job extends over more than one day.

It is an object of the invention to provide a time recording device which records times by punching or otherwise marking a record card for indicating times to be recorded so as to enable the recorded markings to be easily evaluated automatically, whereby the danger of mistakes is avoided.

It is a further object of the invention to provide a time recording device comprising guide means for positioning a record card (which expression is intended also to embrace a record sheet, strip, tape or the like) in the device, and a plurality of marking means controllable by a clock for automatically setting the marking means in dependence on the efflux of time, in such a manner that markings made by the marking means on the record card indicate the time in a binary notation.

These and other objects and advantages of the invention will become apparent from the following detailed description of an embodiment of the invention, when read in conjunction with the appended drawings which are given by way of example and in which:

FIG. 2 is a sectional view, partly broken away, in a plane indicated by the arrows II—II of FIG. 1 the record card, however, being not shown;

FIG. 3 is a sectional view, partly broken away, along the line III—III of FIG. 2;

FIG. 4 is a perspective view, partly broken away, and partly in section showing an arrangement of punch-actuating wheels of the device for actuating the punching of time indications in the record card;

FIG. 7 is a perspective view, partly broken away and partly in section, showing the arrangement of a further punch-actuating wheel of the device, for actuating the punching of working-shift indications in the record card;

FIG. 9 is a perspective view partly broken away, and partly in section, showing a punch and die assembly of the device;

FIG. 10 is a longitudinal sectional view through the punch and die assembly, along the line X—X of FIG. 12;

FIG. 11 is a sectional view through the punch and die assembly, along the line XI—XI of FIG. 10;

FIG. 12 is a sectional view through the punch and die assembly, along the line XII—XII of FIG. 10;

FIG. 13 is a sectional view through the punch and die assembly, along the line XIII—XIII of FIG. 10;

FIG. 14 is a sectional view through the punch and die assembly, along the line XIV—XIV of FIG. 10;

FIG. 15 is a sectional view through the punch and die assembly, along the line XV—XV of FIG. 14;

FIG. 16 is a part sectional view through the punch and die assembly, along the line XVI—XVI of FIG. 15;

Figure 1:
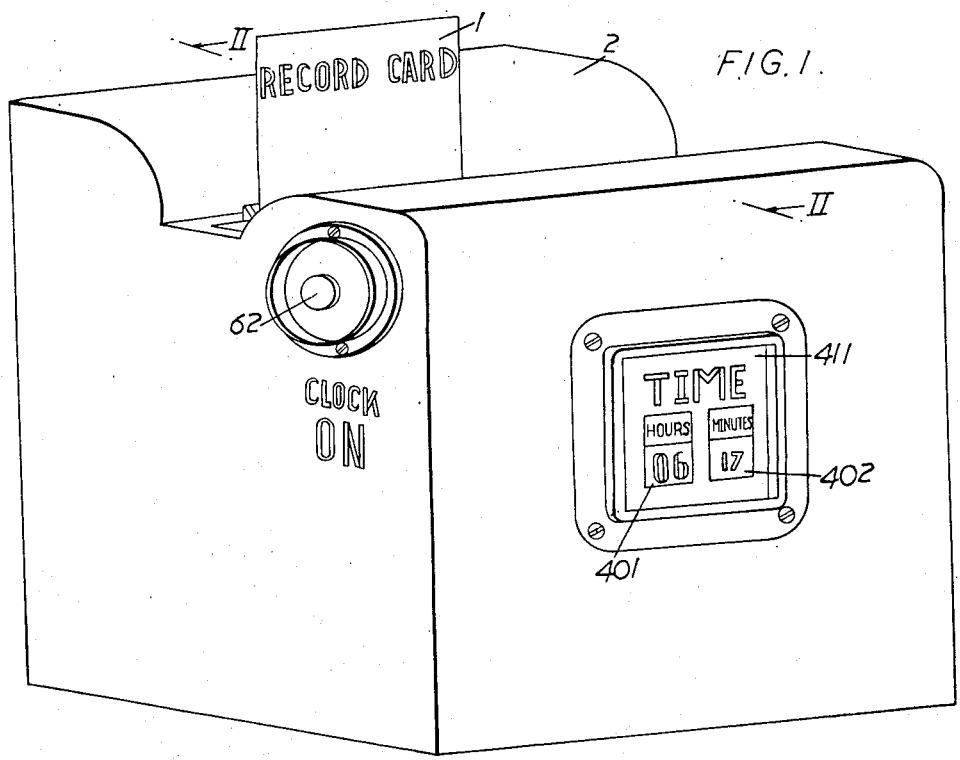
FIG. 1 is a perspective view of a time recording device with a record card inserted therein.

The time recording device, shown in FIG. 1, enables holes to be punched in an elongated record card 1 in a manner such as to be representative of the time of punching and representative also of the working shift to which the time of punching relates. The device comprises an outer casing 2 within which a number of assemblies, visible in FIG. 2 are arranged.

At the upper left hand side of FIG. 2 is indicated an assembly comprising punch-actuating wheels of which only the punch-actuating wheel 3 is visible. At the upper right hand side of FIG. 2 will be seen an assembly comprising a single punch-actuating wheel 100. At the upper centre of FIG. 2 will be seen a punch and die assembly generally indicated by reference numeral 200. At the lower right hand side of FIG. 2 will be seen an electric motor driven switch assembly generally indicated by reference numeral 300, and at the centre left hand side of the figure will be seen a time indicating assembly generally indicated by reference numeral 400.

The assembly of punch-actuating wheels, illustrated in greater detail in FIGS. 3 and 4, comprises four punch-actuating wheels 3, 4, 5 and 6 rotatably mounted on a non rotatable shaft 7. The wheels 3, 4, 5 and 6 are functionally interconnected by pinions 10, 11 and 12 in a manner known per se from step-by-step digital counting mechanisms, the pinions 10, 11 and 12 being rotatably mounted on a pinion shaft 13 for rotation thereon by engagement with projections 14 provided on one end face of each of the wheels 3, 4 and 5.

The pinion 10 is arranged to move the wheel 4 by one eighth of a revolution for each revolution of the wheel 3, the pinion 11 is arranged to move the wheel 5 by one eighth of a revolution on completion of each revolution of the wheel 4 and the pinion 12 is arranged to move the wheel 6 by one eighth of a revolution on completion of each revolution of the wheel 5.

Wheel 3 carries a toothed wheel 15 which normally meshes with a toothed wheel 16 rotatably provided on the pinion shaft 13. Toothed wheel 16 is axially wider than toothed wheel 15, and in addition to meshing with toothed wheel 15 also meshes with a toothed wheel 17 which is coaxial with toothed wheel 15 and identically dimensioned. Toothed wheel 17 is rigidly connected with a toothed wheel 18 also coaxial therewith, wheel 3 being rigid with toothed wheel 18 when toothed wheel 16 unites toothed wheels 15 and 17 by meshing therewith.

Toothed wheel 18 is driven in a step-by-step manner, through one eighth of a revolution per step, by a toothed wheel 19 which is intermittently rotated by a ratchet wheel 21 in a manner known per se from step-by-step digital counting mechanisms. Ratchet wheel 21 is spring loaded by a spring 22 and is mounted on a shaft 23 which is oscillatable against the action of a torsion spring 24 by an electromagnet 25, acting on an armature lever 26 keyed to the shaft 23, the electromagnet 25 being energised once per minute by the switch assembly 300.

The pinion shaft 13 is carried on a reset frame 27 fixed to a rotatable reset shaft 28. The reset shaft 28 is biased by spring means so as normally to occupy the position shown in FIGS. 2 and 4. The shaft 28, with the reset frame 27 is oscillatable by the influence of an electromagnet 31 acting on an armature lever 32 keyed to the shaft 28, the electromagnet 31 being energised for a short period once in every twelve hours by the switch assembly 300. The reset shaft 28 fixedly carries four reset pawls 33 which are adapted to engage four heart shaped cams 34 (only one of which is visible in the figures) respectively provided on an end face of each of the punch-actuating wheels 3, 4, 5 and 6 for returning the wheels 3, 4, 5 and 6 to their initial positions when the reset shaft 28 is oscillated, this reset arrangement being known per se from step-by-step digital counting mechanisms.

Figure 5:
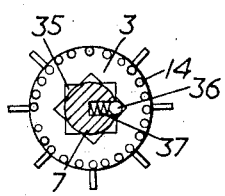
FIG. 5 is an end view of one of the punch-actuating wheels showing the mounting of the wheel on a shaft.

The punch-actuating wheels 3, 4, 5 and 6 are mounted on the shaft 7 in the manner shown in FIG. 5 for wheel 3, the wheel having eight recesses 35 in its central bore for enabling it to assume eight accurately defined positions in cooperation with a ball 36 seated in the shaft 7 the ball being urged by a compression spring 37 into one of the recesses.

Figures 6, 8:
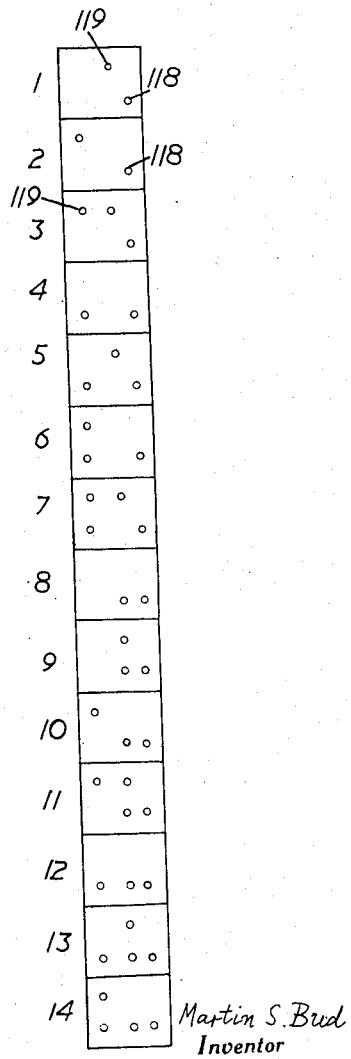
FIG. 6 illustrates in diagrammatic form, developed into a plane, the arrangement of punch-actuating projections on the punch-actuating wheels.
FIG. 8 illustrates in diagrammatic form, developed into a plane, the arrangement of punch-actuating projections on the punch-actuating wheel of FIG. 7.

The punch-actuating wheels 3, 4, 5 and 6 carry radially extending punch-actuating projections 38, wheels 3, 4 and 5 each having three series of projections 38 while wheel 6 has a single series of projections 38. The projections 38 are positioned as shown in FIG. 6, the right hand column of the figure being the developed periphery of wheel 3, the next column that of wheel 4, the next column that of wheel 5 and the next column that of wheel 6. It will be seen that the patterns of projections on wheels 3, 4 and 5 are identical with one another whereas the pattern on wheel 6 consists merely of four equally spaced projections 38.

Considering, for example, wheel 3 it will be seen that the first eighth of the wheel has no projections this being equal to an indication of zero. The next eighth has one projection in the first of the three series of projections counting from the right hand side of the figure this being equal to an indication of $2^0$ or 1. The next eighth has one projection in the second of the three series, this being equal to an indication of $2^1$ or 2. The next eighth has one projection in each of the first and second series, this being equal to an indication of 1 plus 2, that is to say of the digit 3. The next eighth has one projection in the third of the three series, this being equal to an indication of $2^2$ or 4. The next eighth has projections equal to an indication of $2^2+1$ or 5, the next eighth of $2^2+2^1$ or 6, and the last eighth of $2^2+2^1+2^0$ or 7. Since an eight to one ratio transfer exists between wheels 3 and 4, 4 and 5, and 5 and 6, it follows that the first series of projections on wheel 4 represent indications of $2^3$, the second series $2^4$, and the third series $2^5$ and the first series of projections on wheel 5 represent indications of $2^6$, the second series $2^7$ and the third series $2^8$, while the single series of projections on wheel 6 represent indications of $2^9$. Thus the positions of the projections 38 of the punch-actuating wheels 3, 4, 5 and 6 are indicative in binary form of the number of minutes which have elapsed since the punch-actuating wheels 3, 4, 5 and 6 were in their initial positions corresponding to zero.

Reverting to FIGS. 2, 3 and 4, the entire assembly comprising the punch-actuating wheels, reset mechanism, and ratchet mechanism will be seen to be mounted in an inner guide box 41. The guide box 41 is movable towards and away from the punch and die assembly 200, the movement being guided by projections 42 formed on the inner guide box 41 and movable in channels 43 formed in an outer guide box 44. Movement of the inner guide box 41 is effected by an electromagnet 45 acting on an armature 46 connected to an operating link 47 which terminates in an operating bar 48, the ends of the operating bar 48 being secured to the inner guide box 41 (see FIG. 4).

The outer guide box 44, with the inner guide box 41, is movable in a direction at right angles to the direction of movement of the inner guide box 41 and parallel to the shaft 7, by an amount less than the spacing between two successive series of projections 38 on the wheels 3, 4 and 5, the movement being guided by projections 51 formed on the outer guide box 44 and movable in channels 52 provided in an upper guide plate 53, and by projections 54 formed on the outer guide box 44 and movable in channels 55 provided in a lower guide plate 56. The outer guide box 44 is normally held in a central position between its two extremes of movement by means of compression springs 57 which can be seen in FIG. 3, the springs acting on the ends of the outer guide box 44 through distance plates 58, other distance members 59 serving to provide a positive stop for the movement.

At the right hand side of the device as viewed in FIG. 3, which corresponds to the left hand side of the device as viewed in FIG. 1, a push button 62 is provided, and at the opposite side of the device a push button 61 is provided. The push buttons 61 and 62 are coupled by transfer members 63 and 64 respectively to end faces of the outer guide box 44 so that on exerting a sufficient pressure on push button 61 the outer guide box 44 together with the inner guide box 41 and the punch-actuating wheel assembly is moved to the right, as viewed in FIG. 3, whereas on exerting a sufficient pressure on push button 62 the outer guide box 44 together with the inner guide box 41 and the punch-actuating wheel assembly is moved to the left, as viewed in FIG. 3.

A side wall 65 of the device, adjacent to the push button 61, carries a micro-switch 66 which is connected in parallel with a similar micro-switch 67 provided adjacent to the push button 62 at the opposite side wall 68 of the device; the switch 66 operates to close a circuit for the electromagnet 45 when as a result of pressure on push button 62 the outer guide box 44 reaches its extreme left hand position as viewed in FIG. 3, switch 67 operating similarly in relation to push button 61.

Referring now to FIGS. 2 and 7, the single punch-actuating wheel 100 will be seen to be mounted on a shaft 101. The shaft 101 is non-rotatable and extends parallel to the shaft 7 of the wheels 3, 4, 5 and 6, the wheel 100 being rotatable on the shaft 101 between two collars 102 only one of which is visible in FIG. 7. The wheel 100 has fourteen recesses 103 in its central bore for enabling it to assume fourteen accurately defined positions in cooperation with a ball 104 seated in the shaft 101, the ball 104 being urged by a compression spring 105 into one of the recesses 103. A toothed wheel 106 is rigidly mounted on the wheel 100 and is engaged by a toothed wheel 107 mounted on a shaft 108.

The toothed wheel 106 together with the punch-actuating wheel 100 is driven in a step-by-step manner, through one fourteenth of a revolution per step, by the toothed wheel 107 which is intermittently rotated by a ratchet wheel 110 in a manner known per se from step-by-step digital counting mechanisms. Ratchet wheel 110 is loaded by a spring 111 and is mounted on a ratchet shaft 112 which is oscillatable against the action of a torsion spring 113 by an electromagnet 114 acting on an armature lever 115 keyed to the shaft 112, the electromagnet 114 being energised in the same sequence as the electromagnet 31, that is to say once every twelve hours. The electromagnet 114 is mounted on a bracket 116 fixed to a rear wall 117 of the device.

The punch-actuating wheel 100 has fourteen peripheral faces each of which carries one punch-actuating projection 118 and one, two or three other punch-actuating projections 119. The projections 118 and 119 are positioned as shown in FIG. 8. It will be seen that there is one peripheral series of projections 118 on the wheel 100 and two peripheral series of projections 119. As can be seen in FIG. 8, the projections 118 do not vary in position from face to face of the wheel whereas the projections 119 of the two remaining series form on the individual faces of the wheel distinctive patterns which are indicative of the numbers 1 to 14 and represent working shifts.

The punch and die assembly shown in FIGS. 2 and 9 to 15 and generally indicated by reference numeral 200, comprises a housing member 201 movable on V-guides 202 towards and away from the punch-actuating wheel 100. From FIGS. 9, 10, 11 and 13 it will be seen that the housing member 201 carries a punch guide block 203 which is secured to a die block 204, in part through the intermediary of a spacing block 205. In space 206 between the punch guide block 203 and the die block 204 formed by the spacing block 205, ten rectangular punches 207 are provided, the die block 204 having ten correspondingly positioned rectangular die openings 208. Each punch 207 has allocated thereto a return fork 210 acted upon by a return spring 211, the return forks 210 being mounted on a spindle 212, the forks 210 and the springs 211 being arranged in the space 206. The ends of the punches 207 opposite to their punching ends, are of reduced cross section and are positioned within apertures 213 in the punch guide block 203 which face the assembly of punch-actuating wheels 3, 4, 5 and 6.

Secured to the die block 204 and positioned between the die block 204 and a cover plate 214, a transfer bar 215 is provided by means of which the die block 204, punch guide block 203 and the punches 207 can be moved as a unit by a small amount to either side of a rest position in the longitudinal direction of the punch and die assembly, the movement being of the same extent as the movement of the assembly of punch-actuating wheels 3, 4, 5 and 6 and being effected by lugs 216 projecting from the outer guide box 44 (see FIGS. 4 and 9).

From FIGS. 9 to 12, and 14 to 16 it will be seen that in addition to the ten punches 207 the shanks of which face the punch-actuating wheels 3, 4, 5 and 6, there are provided four rectangular punches 220 the shanks of which face the punch-actuating wheel 100 (see FIG. 2). These punches 220 are arranged at the corners of a rectangular pattern, that is to say in two parallel rows of two, the shanks being guided in apertures 221 formed in a punch guide plate 222 secured to the housing member 201. The punches 220 cooperate with die apertures 223 formed in the housing member 201. The spacings between the punches 220 correspond to the spacings between the projections 119 on individual faces of the punch-actuating wheel 100 of FIG. 7. Each punch 220 has allocated thereto a return fork 224 acted upon by a return spring 225, the return forks 224 being mounted on spindles 226, the forks 224 and springs 225 being arranged in a space 227 between the housing member 201 and the guide plate 222.

In addition to the four rectangular punches 220, a single circular punch 228 is provided the punch 228 being spaced from the punches 220 by the same distance as the spacing of the projections 118 from the projections 119 of the punch-actuating wheel 100 of FIG. 7. Punch 228 is guided in an aperture 230 of the punch guide plate 222 and cooperates with a die aperture 231 formed in the housing member 201. A return lever 232 for the punch is mounted on a spindle 233 in the space 227 and acted upon by a return spring 234.

Associated with the punch 228 is a record card location mechanism which will now be described with reference to FIGS. 14, 15 and 16. In a bore 235 formed in the housing member 201 parallel to the die aperture 231, a locating peg 236 is arranged to be axially movable towards and away from the record card slot 217. The locating peg 236 is pivoted to an actuating member 237 provided with a guide 238 movable in a recess 240 of the housing member 201. The guide 238 is linked by a compression spring 241 to a pressure plate 242 which is biased away from the housing member 201 by two springs 243. The pressure plate 242 is acted upon by a roller 244 mounted by a pair of lever arms 245 of a double bell crank lever 246, the other pair of arms 247 of the bell crank lever 246 having a roller 248 operating thereon, the bell crank lever 246 being pivoted to the housing member 201 by a pivot spindle 251. The loading peg 236 is normally held in line with the actuating member 237 by a spring 252.

The face of the housing member 201 opposite to the cover plate 214 carries a closure plate 253 to which a card guide 254 is secured.

Referring now once again to FIG. 2, the two remaining sub assemblies, namely the switch assembly 300 and the time indicating assembly 400 will be described.

Figure 17:
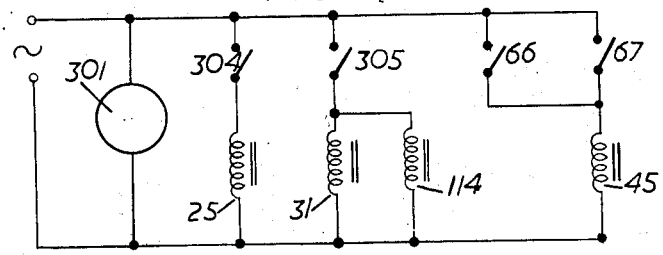
FIG. 17 is an electric circuit diagram of the device.

The switch assembly 300 comprises an electric motor 301 which by means of a gear drive diagrammatically represented by a gear 302 drives a cam arrangement diagrammatically represented by a cam 303, in such a manner that the cam arrangement causes a micro-switch 304 to close for a short period every minute and causes a micro-switch 305 to close for a short period every twelve hours. The motor 301, the micro-switches 66, 67 (see FIG. 3), the micro-switches 304, 305, and the electromagnets 25, 31, 45 and 114 are connected in an electric circuit shown in FIG. 17. From the circuit diagram, it will be seen that the motor 301 is connected across a source of alternating current. Micro-switch 304 is connected in series with electromagnet 25, micro-switch 305 in series with a parallel combination of electromagnets 31 and 114. Micro-switches 66 and 67, themselves connected in parallel, are connected in series with electromagnet 45.

The time indicating assembly 400 comprises two indicating wheels 401 and 402 (see FIGS. 1 and 2). Wheel 401 is marked 1 to 24 for indicating hours and wheel 402 is marked 1 to 60 for indicating minutes. Wheel 402 is driven in a step-by-step manner by one sixtieth of a revolution per step by a chain drive arrangement from the ratchet shaft 23 (see also FIG. 4), the chain drive arrangement comprising a sprocket wheel 403 keyed to the ratchet shaft 23, a chain 404, an intermediate sprocket wheel pair 405 mounted on an intermediate shaft 406, a chain 407, and a sprocket wheel 408 fixed to wheel 402. Wheel 401 is driven from wheel 402 by a 24 to 1 reduction transfer effected by a pinion 410 in a manner known per se from step-by-step digital counting mechanisms. The markings on the wheels 401 and 402 are visible from the front of the device through a window 411.

The operation of the device is as follows:

Operation of the switch assembly 300 causes electromagnet 25 to be pulsed once each minute, punch-actuating wheel 3 making one step for each pulse. By means of the transfer pinions 10, 11 and 12 the other punch-actuating wheels 4, 5 and 6 are correspondingly stepped, so that in accordance with the arrangement of projections shown in FIG. 6, the positions of the projections 38 of the wheels 3, 4, 5 and 6 are indicative of the time in binary notation. Due to their coupling to the ratchet shaft 23, the time indicating wheels 401 and 402 indicate the time in directly readable form.

Operation of the switch assembly 300 also causes electromagnets 31 and 114 to be pulsed every twelve hours. Pulsing of electromagnet 31 in this manner causes the pinion shaft 13 to be retracted from the wheels 3, 4, 5 and 6, and the reset pawls 33 to be operative on the heart shaped cams 34 of the wheels 3, 4, 5 and 6 to reset these wheels to their initial zero position, such a resetting action being well known per se from digital counting mechanisms. Pulsing of electromagnet 114 causes the punch-actuating wheel 100 to be advanced by one step every twelve hours.

The device is intended for use in connection with working periods in which each working shift is of twelve hours nominal duration. Thus the wheels 3, 4, 5 and 6 are returned to zero at the end of each twelve hour period, whereas wheel 100 is stepped once each twelve hours for enabling indication of fourteen different working shifts per week, the projections 119 of the wheel 100 forming fourteen different patterns.

When a record card 1 (see FIGS. 1 and 2) is placed in the card receiving slot 217, if no previous punchings have been made in the card, the lower end of the card passes to the bottom of the guide 254. In moving down the card guide 254, the end of the card presses the roller 248 (see FIG. 14) into the position shown in broken lines. This causes roller 244 to act on the pressure plate 242 compressing springs 241 and 243. The spring 241 urges the peg 236 against the card but not so strongly as to cause the peg 236 to penetrate the card, the card rubbing against the peg 236 in passing to the bottom of the card guide 254. If now either of the push buttons 61 or 62 is pressed, depending on whether a "clocking-on" or a "clocking-off" punching is desired, the electromagnet 114 is energized by the microswitch 66 or 67 respectively, causing the inner guide box 41 and the entire assembly of punch-actuating wheels 3, 4, 5 and 6 to be drawn towards the punch and die assembly 200. The projections 38 of the punch-actuating wheels 3, 4, 5 and 6 which are facing the punch and die assembly 200 thus come to act against the shanks of the punches 207.

The housing member 201 of the punch and die assembly 200 can, however, move along the V-guides 202, so that after the projections 38 contact the shanks of the punches 207 the movement of the inner guide box 41 continues, with the result that the punch and die assembly, with the inserted card 1, is moved against the punch-actuating wheel 100, the shanks of the punches 220 abutting against the projections 119 of the operative face of wheel 100 and the shank of the punch 228 abutting against the projection 118 thereof. On further movement of the inner guide box 41 the punches 207, 220 and 228 are thus caused to punch the card in co-operation with their respective die apertures.

Holes punched in the card by punches 207 are indicative of the time of punching in binary notation, holes punched by punches 224 are indicative of the working shift in the code given in FIG. 8 by projections 119, and the hole punched by punch 228 serves for enabling location of the card for a next punching.

In pressing the push button 61 or 62 the outer guide box 44, together with the inner guide box 41 and those parts of the punch and die assembly associated with the punches 207 are moved to one side or the other, depending on which of the buttons 61 or 62 is pressed, without however moving the card 1. Thus the holes punched in the card by the punches 207 are displaced to one side or the other of a central position depending on whether a "clocking-on" punching or a "clocking-off" punching was made. It is therefore possible by the arrangement of holes in the card to indicate, for each individual punching, the time of punching, the shift, and either "clocking-on" or "clocking-off."

When the same card is again inserted in the slot 217, the end of the card again presses the roller 248 (see FIG. 14) into the position shown in broken lines. This causes roller 244 again to act on the pressure plate 242, compressing springs 241 and 243. When a hole punched in the card by punch 228 in the previous punching operation reaches the locating peg 236, the spring 241 urges the peg 236 into the hole, thus locating the card for the next punching operation. On removing the card, the locating peg 236 pivots against spring 252 allowing removal of the card, and the springs 241 then return the pressure plate 242 and the locating peg 236 to their initial positions. On each insertion of the card the locating peg 236 enters the first hole that reaches it, that is to say the hole punched in the previous punching operation. Thus successive punchings on a card lie in parallel rows below each other. Cards punched in the manner described above, lend themselves to evaluation by automatic sensing equipment.

Figure 18:
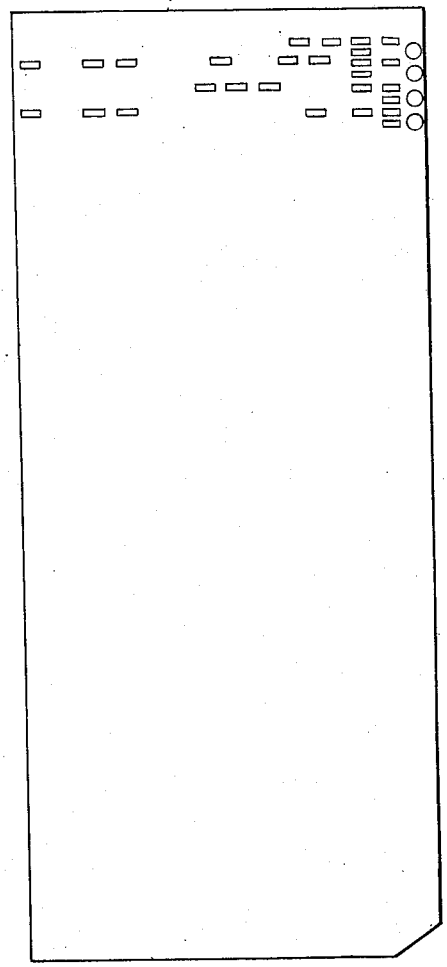
FIG. 18 illustrates a record card on which various punching operations have been performed.

By way of example, FIG. 18 illustrates a record card which has been punched with the following information:

First row of punching—Shift No. 7, clock-on at time 12:03 a.m. (punchings in columns 1 and 2 representing $2^0+2^1$ minutes or 003 minutes).

Second row of punching—Shift No. 7, clock-off at time 11:55 a.m. (punchings in columns 1, 2, 4, 7, 8 and 10 representing $2^0+2^1+2^3+2^6+2^7+2^9$ or 715 minutes).

Third row of punching—Shift No. 11, clock-on at time 12:28 a.m. (punchings in columns 3, 4 and 5 representing $2^2+2^3+2^4$ or 028 minutes).

Fourth row of punching—Shift No. 11, clock-off at time 11:45 a.m. (punchings in columns 1, 7, 8 and 10 representing $2^0+2^6+2^7+2^9$ or 705 minutes).

Figure 19:
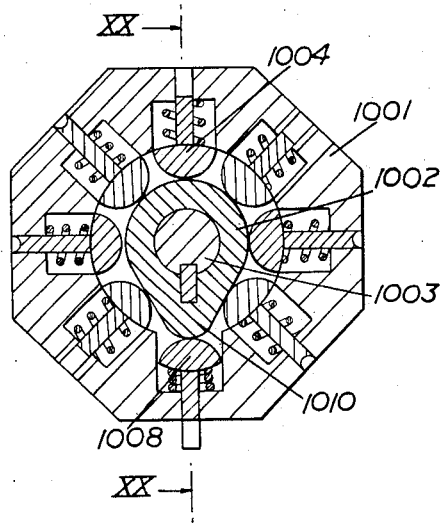
FIG. 19 is a sectional view of a modified form of punch-actuating wheel, showing the mounting of the wheel on a shaft, the section being taken along the line XIX—XIX of FIG. 20.
Figure 20:
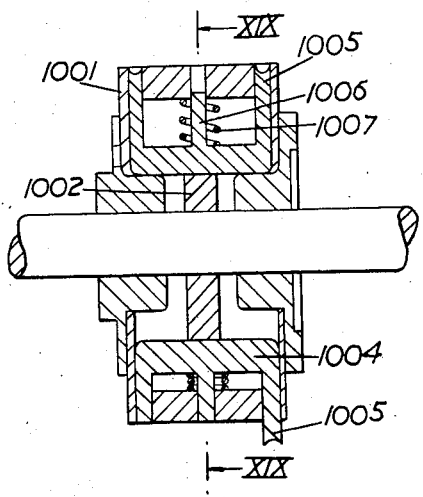
FIG. 20 is a sectional view through the modified punch-actuating wheel, along the line XX—XX of FIG. 19.

The punch-actuating wheels 3, 4 and 5, instead of being in the form described above, may be in the modified form shown in FIGS. 19 and 20. In this form, each wheel comprises an octagonal body member 1001 rotatable in a stepwise manner around a cam 1002 keyed to a non-rotatable shaft 1003. Mounted within the body member 1001, eight projection members 1004 are provided, seven of which have one or more projections 1005 and each of which has a guiding stud 1006 movable in a passage in the body member 1001. The guiding studs 1006 are fitted with compression springs 1007 for urging heads 1008 of the members 1004 towards the cam 1002. A nose 1010 provided on the cam 1002 engages the head 1008 of one of the members 1004 at a time causing projections 1005 of the engaged member 1004 to project from the body member 1001 and be thus available for engaging the punch and die assembly 100 (see FIG. 2) in the same manner as were the projections 38 of wheels 3, 4 and 5.

Forms of marking other than punching may be used. For example the marking may be made by printing with ink, which may be a magnetic ink. In this case the punches 207 and 220 and the die openings 209 and 221 are replaced by printing members having ink feed arrangements.

Cards marked in the device of the invention can easily be read automatically with the aid of a suitable reader. If the marking is by means of punching, the reader may operate mechanically, electrically or photoelectrically. If the marking is by means of printing the reader may operate photoelectrically or in the case of magnetic ink marking the reader may sense the markings magnetically. The device may be arranged to use record cards having a different arrangement of marking areas than that described. The markings may be reversed, so that holes are punched in the columns at positions which are not significant whereas holes are not punched in the columns at positions which are significant.

Means, for example an electric interlock of known form, may be provided for ensuring that a punching operation attempted during an instant when the punch-actuating wheels are changing to a different combination is rendered ineffective and does not damage the device, or for delaying the punching until the change of the punch-actuating wheels has been completed. Means may also be provided for preventing punching until a card has been properly inserted into the guide.

In a further modification of the device, the means for ensuring that each successive marking operation on the same record card is made in successive parallel rows may comprise an abutment for limiting the extent to which a card is insertable into the device and a cutter for removing a portion of the edge of the card on each marking operation whereby to enable the card to be inserted to a further extent on each successive marking operation.

In the embodiment described, the wheels 3, 4, 5 and 6 have projections 38 arranged according to a true binary coding. It is however alternatively possible to use a coded binary coding in which individual digits of a decimal number are represented in binary form.

I claim:
1. In and for a time recording device, the combination of guide means for a record card, a first set of tools arranged at one side of said guide means for acting on one side of a record card when in said guide means to mark the same in a binary notation, a second set of tools arranged at the opposite side of said guide means for acting on the other side of the record card to additionally mark the same in a binary notation, first means for actuating tools of the first set of tools, second means for actuating tools of the second set of tools, a time mechanism, means for setting said first and said second tool actuating means in dependence on said time mechanism, means for moving said first tool actuating means towards said first set of tools to displace tools of said first set towards said guide means, and means for displacing said guide means towards said second tool actuating means, whereby to cause tools of the first and second sets of tools selected in dependence on the efflux of time by the first and second tool actuating means to mark the record card in said guide means.

2. The combination defined in claim 1, wherein the sets of tools comprise punches for punching markings into the record card, a die member being provided for co-operation with said punches.

3. In and for a time recording device, the combination of guide means for a record card, a first set of punches arranged at one side of said guide means for punching a record card when in said guide means from one side thereof, a second set of punches arranged at the opposite side of said guide means for punching the record card from the other side thereof, dies arranged for co-operation with said punches, said punches and dies constituting a unitary assembly with at least part of the guide means between them, first punch actuating means arranged for co-operation with said first set of punches, second punch actuating means arranged for co-operation with said second set of punches, projections on said first and second punch actuating means, a time mechanism, means for aligning projections on said first and second punch actuating means with punches in dependence on said time mechanism, and means for moving said first punch actuating means together with the punch and die assembly and the guide means towards said second punch actuating means, whereby projections of said first and second punch actuating means which are in alignment with punches cause the same to penetrate the card in the guide means.

References Cited in the file of this patent
UNITED STATES PATENTS

| | | |
|---|---|---|
| 1,206,089 | Bryce | Nov. 28, 1916 |
| 1,219,765 | Peirce | Mar. 20, 1917 |
| 2,087,315 | Bugg et al. | July 20, 1937 |
| 2,705,105 | Paschen | Mar. 29, 1955 |
| 2,922,687 | Cooper et al. | Jan. 26, 1960 |

FOREIGN PATENTS

| | | |
|---|---|---|
| 199,389 | Austria | Feb. 15, 1958 |